US009264809B2

(12) United States Patent
Forero et al.

(10) Patent No.: US 9,264,809 B2
(45) Date of Patent: Feb. 16, 2016

(54) MULTITASK LEARNING METHOD FOR BROADBAND SOURCE-LOCATION MAPPING OF ACOUSTIC SOURCES

(71) Applicant: The United States of America as represented by the Secretary of the Navy, Washington, DC (US)

(72) Inventors: Pedro A. Forero, San Diego, CA (US); Paul A. Baxley, Santee, CA (US)

(73) Assignee: THE UNITED STATES OF AMERICA AS REPRESENTED BY THE SECRETARY OF THE NAVY, Washington, DC (US)

(*) Notice: Subject to any disclaimer, the term of this patent is extended or adjusted under 35 U.S.C. 154(b) by 25 days.

(21) Appl. No.: 14/285,400

(22) Filed: May 22, 2014

(65) Prior Publication Data
US 2015/0341723 A1 Nov. 26, 2015

(51) Int. Cl.
*H04R 3/00* (2006.01)
*H04R 29/00* (2006.01)

(52) U.S. Cl.
CPC ............. *H04R 3/005* (2013.01); *H04R 29/005* (2013.01)

(58) Field of Classification Search
CPC .. H04R 3/005; H04R 2499/11; H04R 29/001; H04R 1/406; H04R 2430/03; H04R 2430/20
USPC .......................................................... 381/92
See application file for complete search history.

(56) References Cited

U.S. PATENT DOCUMENTS

| 6,347,148 | B1* | 2/2002 | Brennan | H04R 25/453 381/312 |
| 8,290,170 | B2* | 10/2012 | Nakatani | 381/66 |
| 8,577,686 | B2* | 11/2013 | Oh | H04S 1/007 341/50 |
| 8,995,671 | B2* | 3/2015 | Nakadai | G10L 21/0208 381/56 |

OTHER PUBLICATIONS

Baggeroer, A. B., W. A. Kuperman, and P. N. Mikhalevsky, "An overview of matched field methods in ocean acoustics," IEEE J. Ocean. Eng.,vol. 18, No. 4, pp. 401-424, 1993.
Baggeroer, A. B, W. A. Kuperman, and H. Schmidt, "Matched field processing: Source localization in correlated noise as an optimum parameter estimation problem," J. Acoust. Soc. Am., vol. 83, No. 2, pp. 571-587, 1988.
Brienzo, R. K. and W. S. Hodgkiss, "Broadband matched-field processing," The Journal of the Acoustical Society of America, vol. 94, No. 5,1993.

(Continued)

*Primary Examiner* — Mark Blouin
(74) *Attorney, Agent, or Firm* — SPAWAR Systems Center Pacific; Kyle Eppele; Ryan J. Friedl

(57) ABSTRACT

A method involves acoustic source localization by capitalizing on the sparse nature of a source location map (SLM). Sparsity arises naturally since one seeks the location of K sources in a grid of G tentative locations where G>>K. The source localization problem is cast as a regularized LS regression problem with a sparsity constraint whose solution yields the SLM. An iterative solver based on block coordinate descent (BCD) is used. BCD leads to scalar closed-form updates rendering the method's computational complexity per iteration linear with respect to the grid size. The disclosed method enables high resolution location estimation with fewer array measurements than classical matched field processing methods.

17 Claims, 8 Drawing Sheets

(56) References Cited

OTHER PUBLICATIONS

Caruana, R., "Multitask learning," Machine Learning, vol. 28, No. 1, pp. 41-75, 1997.

Clay, C. S., "Optimum time domain signal transmission and source location in a waveguide," The Journal of the Acoustical Society of America, vol. 81, No. 3, pp. 660-664, 1987.

Czenszak, S. P. and J. L. Krolik, "Robust wideband matched-field processing with a short vertical array," J. Acoust. Soc. Am., vol. 101, No. 2, pp. 749-759, 1997.

Debever, C. and W. A. Kuperman, "Robust matched-field processing using a coherent broadband white noise constraint processor," J. Acoust. Soc. Am., vol. 122, No. 4, pp. 1979-1986, 2007.

D'Spain, G. L., J. J. Murray, W. S. Hodgkiss, N. O. Booth, and P. W. Schey, "Mirages in shallow water matched field processing," J. Acoust. Soc. Am., vol. 105, No. 6, pp. 3245-3265, 1999.

Fannjiang, A. C., T. Strohmer, and P. Yan, "Compressed remote sensing of sparse objects," SIAM J. on Imaging Sciences, vol. 3, No. 3, pp. 595-618, 2010.

Friedman, J., T. Hastie, H. Höfling, and R. Tibshirani, "Pathwise coordinate optimization," The Annals of Applied Statistics, vol. 1, No. 2, pp. 302-332, 2007.

Lennartsson, R. K., E. Dalberg, L. Persson, and S. Petrovic, "Passive acoustic detection and classification of divers in harbor environments," in Proc. of MTS/IEEE Oceans, Oct. 26-29, Biloxi, Mississippi, USA, 2009, pp. 1-7.

Liu, C., Y. V. Zakharov, and T. Chen, "Broadband underwater localization of multiple sources using basis pursuit de-noising," IEEE Transactions on Signal Processing, vol. 60, No. 4, pp. 1708-1717, 2012.

Liu, H., M. Palatucci, and J. Zhang, "Blockwise coordinate descent procedures for the multi-task Lasso with applications to neural semantic basis discovery," in Proc. of International Conference on Machine Learning, Jun. 14-18, Montreal, Canada 2009.

Lorenz, R. G. and S. P. Boyd, "Robust minimum variance beamforming," IEEE Transactions on Signal Processing, vol. 53, No. 5, pp. 1684-1696, 2005.

Malioutov, D. M., M. Cetin, and A. S. Willsky, "A sparse signal reconstruction perspective for source localization with sensor arrays," IEEE Trans. Signal Process., vol. 53, No. 8, pp. 3010-3022, 2005.

Mantzel, W., J. Romberg, and K. Sabra, "Compressive matched-field processing," J. Acoust. Soc. Am., vol. 132, No. 1, pp. 90-102, 2012.

Michalopoulou, Z.H. and M. B. Porter, "Matched-field processing for broad-band source localization," IEEE Journal of Oceanic Engineering, vol. 21, No. 4, pp. 384-392, 1996.

Neumaier, A., "Solving ill-conditioned and singular linear systems: A tutorial on regularization," SIAM Rev., vol. 40, No. 3, pp. 636-666, 1998.

Orris, G. J., M. Nicholas, and J. S. Perkins, "The matched-phase coherent multi-frequency matched-field processor," J. Acoustic. Soc. Am., vol. 107, No. 5, pp. 2563-2575, 2000.

Quattoni, A., X. Carreras, M. Collins, and T. Darrell, "An efficient projection for l infinite regularization," in Proc. of International Conference on Machine Learning, Jun. 14-18, Montreal, Canada 2009.

Simard, Y., N. Roy, and C. Gervaise, "Passive acoustic detection and localization of whales: Effects of shipping noise in Saguenay—St. Lawrence Marine Park," The Journal of the Acoustical Society of America, vol. 123, No. 6, pp. 4109-4117, 2008.

Tseng, P., "Convergence of a block coordinate descent method for nondifferentiable minimization," J. Optim. Theory Appl., vol. 109, No. 3, pp. 475-494, 2001.

Vogt, J. E. and V. Roth, "A complete analysis of the 'l;p group-Lasso," in Proc. of International Conference on Machine Learning, Jun. 26-Jul. 1, Edinburgh, Scotland 2012.

Wang, J., J. Liu, and J. Ye, "Efficient Mixed-Norm Regularization: Algorithms and Safe Screening Methods," ArXiv e-prints, Jul. 2013.

Westwood, E. K., "Broadband matched-field source localization," J. Acoust. Soc. Am., vol. 91, No. 5, pp. 2777-2789, 1992.

Xiang, Z. J. and P. J. Ramadge, "Fast lasso screening tests based on correlations," in IEEE International Conference on Acoustics, Speech and Signal Processing, 2012, pp. 2137-2140.

Xiang, Z. J., H. Xu, and P. J. Ramadge, "Learning sparse representations of high dimensional data on large dictionaries," in Advances of Neural Information Processing Systems 24, J. Shawe-Taylor, R. S. Zemel, P. Barlett, F. C. N. Pereira, and K. Q. Weinberger, Eds., 2011, pp. 900-908.

Yuan, M. and Y. Lin, "Model selection and estimation in regression with grouped variables," Journal of the Royal Statistical Society: Series B (Statistical Methodology), vol. 68, No. 1, pp. 49-67, 2006.

\* cited by examiner

700

---
Algorithm 2 BCD for broadband SLM (BB-SLM)
---
Require: Tuples $\{(\bar{y}_f, P_f)\}_{f=1}^F, \mu > 0, q \in (1, \infty) \cup \{\infty\}$.

1:   Set $s_g^{(0)} = 0_F, \forall g$
2:   for $\tau = 1, 2, \ldots$ do
3:     for $g = 1, \ldots, G$ do
4:       if $\|h_g^{(\tau)}\|_p \leq \mu$ then
5:         $\varrho_g^{(\tau)} = 0_F$
6:       else
7:         Compute $e_{g,f}^{(\tau)}, \forall f,$ via (8b).
8:         Compute $\Theta_{g,f}^{(\tau)}, \forall f,$ via (11).
9:         if $q = 1$ and $\Sigma_f = \lambda I_F, \forall f$ then
10:           Compute $\varrho_g^{(\tau)}$ via =(23)
11:         else if $q = 2$ and $\Sigma_f = \lambda I_F, \forall f$ then
12:           Compute $\varrho_g^{(\tau)}$ via =(15)
13:         else
14:           Compute $\tilde{z}_g^{(\tau)}$ as the minimizer of (21).
15:           Set $\varrho_g^{(\tau)} = H_g^{-1}(h_g^{(\tau)} - H^{1/2} \tilde{z}_g^{(\tau)})$
16:         end if
17:       end if
18:       return $s_g^{(\tau)}$ with entries $[s_g^{(\tau)}]_f = [\varrho_g^{(\tau)}]_f e^{j\theta_{g,f}^{(\tau)}}, \forall f.$
19:     end for
20: end for

MULTITASK LEARNING METHOD FOR BROADBAND SOURCE-LOCATION MAPPING OF ACOUSTIC SOURCES

FEDERALLY-SPONSORED RESEARCH AND DEVELOPMENT

The Multitask Learning Method for Broadband Source-Location Mapping of Acoustic Sources is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102945.

BACKGROUND

Using passive sonar for localizing multiple acoustic sources in shallow water is a fundamental task for underwater surveillance and monitoring systems. These systems typically use an array of hydrophones to collect sound generated by underwater acoustic sources without radiating sound to the water. Moreover, their impact on the maritime environment is minimal when compared to the one of similar systems using active sonar. Localization using passive sonar is complicated by the complexities of underwater acoustic propagation, interactions among multiple acoustic sources, and the uncertain dynamics of the acoustic propagation environment. Shipping lanes, marine life, and other environmental factors introduce noise that masks acoustic signals of interest and leads to low signal-to-noise ratios (SNRs) at the hydrophone array.

Matched-field processing (MFP) has been the workhorse for underwater source localization via passive sonar. MFP postulates a grid of tentative source locations and uses an acoustic propagation model to predict the acoustic pressure fields, also known as replicas, at the hydrophone array caused by an acoustic source at each grid location. The replicas are then "matched" to the acoustic measurements to generate the so-called ambiguity surface summarizing acoustic power estimates across the grid. Next, the localization problem is reduced to a peak-picking one over the ambiguity surface.

Despite its popularity, MFP has been challenged by scenarios with multiple sources and environmental mismatch. In narrowband passive-sonar-based localization, it has been empirically observed that using high frequencies yields high source resolution at the expense of increased sensitivity to model mismatch, whereas using low-frequencies yields reduced sensitivity to model mismatch at the expense of reduced source resolution. A need exists for an underwater source localization algorithm with improved resolution and resilience to model mismatch.

BRIEF DESCRIPTION OF THE DRAWINGS

FIG. 8 shows a diagram illustrating an embodiment of block coordination decent method for use in accordance with the Multitask Learning Method for Broadband Source-Location Mapping of Acoustic Sources.

DETAILED DESCRIPTION OF SOME EMBODIMENTS

Figure 1:
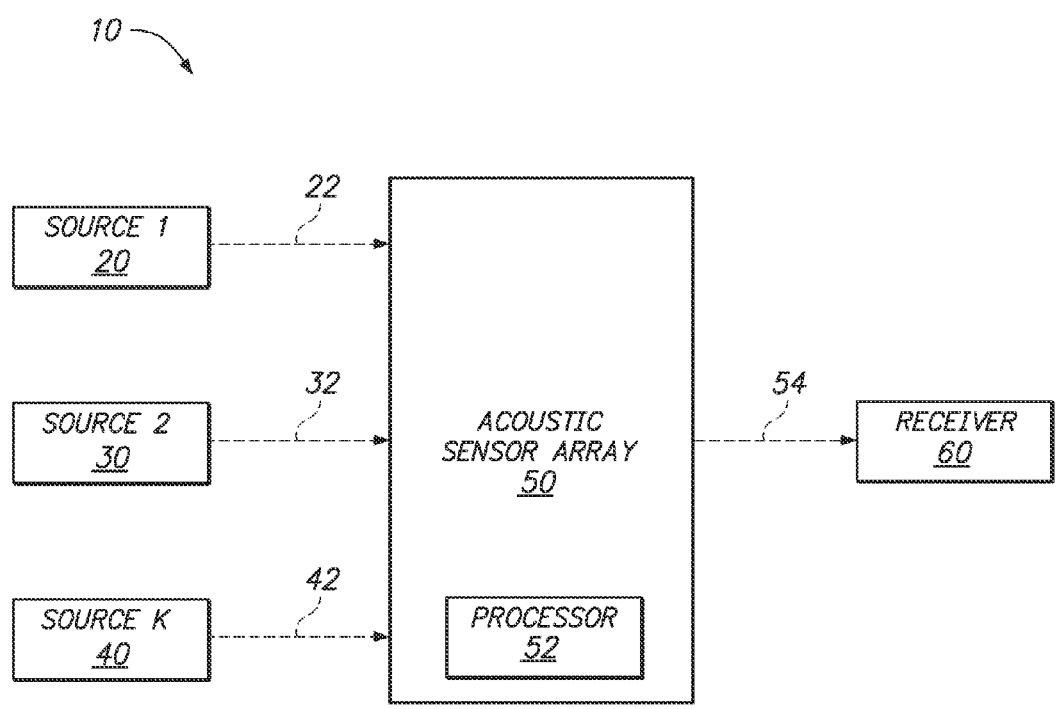
FIG. 1 shows a block diagram of an embodiment of the operational concept of a system in accordance with the Multitask Learning Method for Broadband Source-Location Mapping of Acoustic Sources.

In some embodiments, the subject matter disclosed herein involves underwater source localization by capitalizing on the sparse nature of a source location map (SLM). Sparsity arises naturally since one seeks the location of K sources in a grid of G tentative locations where G>>K. Traditionally, MFP has focused on the ambiguity surface describing acoustic power. However, due to constructive and destructive interactions of sound propagating in water, the ambiguity surface shows high power peaks, with amplitudes dependent on factors such as array aperture, frequency, and water depth, at locations other than the true source locations. Instead, in the method disclosed herein the robust source localization problem is cast as a regularized least-squares (LS) regression problem with a sparsity constraint whose solution yields the SLM. An iterative solver based on block coordinate descent (BCD) is used to solve the resulting regression problem. BCD leads to scalar closed-form updates rendering the algorithm's computational complexity per iteration linear with respect to the grid size. The disclosed method enables high resolution location estimation with fewer array measurements than classical MFP algorithms.

Instead of relying on acoustic power estimation as is done in MFP, the embodiments of the disclosed method formulate the broadband localization problem as a multi-task learning (MTL) problem. MTL seeks to simultaneously learn related tasks with the hope that information shared across them improves the generalization capabilities of the learning algorithm. The proposed method operates on the Fourier coefficients of the measured acoustic time-series data for a predefined set of frequencies. Per frequency, Fourier coefficients are modeled as a linear combination of replicas for a grid of tentative locations. Intuitively, only expansion coefficients corresponding to a true source location should partake in the regression, whereas all other expansion coefficients should be zero. Since the number of expansion coefficients (one per grid location) is larger than the number of sources, they are inherently sparse. Moreover, it is natural to require expansion coefficients for different frequencies to have a common support since the grid is common for all frequencies. These desiderata are naturally captured within the MTL framework by the group-Lasso regularizer.

Model mismatch further compounds the source localization problem by inducing ambiguities on the expansion coefficients and, thus, hinders source-location estimates. To alleviate this issue, each task is cast as a robust signal approximation problem, namely, a regularized stochastic LS one that explicitly accounts for model mismatch effects on the replicas. These tasks are coupled through group-Lasso penalties inducing a sparse and common support across regression coefficients.

BCD solvers are developed to enable efficient estimators for the expansion coefficients that can be used for constructing a broadband source location map (SLM). To reduce the computational complexity of the BCD solver, predictor screening rules that zero groups of regression coefficients prior to solving the optimization problems are used. These screening rules extend the Lasso ones to the group-Lasso family of $l_1/l_q$-regularizers with complex-valued optimization variables.

Broadband MFP approaches can be divided to time- and frequency-based ones. Time-based approaches rely on knowledge of the acoustic source signature. These methods entail high computational complexity in part due to the dense sampling that is required to avoid temporal aliasing in the model predicted temporal signatures. Frequency-based methods do not impose a sampling requirement and are, thus, preferred in situations where computational resources are scarce. Classical broadband MFP frequency based approaches for localization perform incoherent averages of log-ambiguity surfaces across frequencies to construct a broadband one. These approaches presume that constructive interference occurs around the main peaks of the ambiguity surface while destructive interference occurs elsewhere.

Although computationally simple, the latter approaches do not exploit the coherent phase information between measurements and replicas across frequencies. Second-order cross-correlations and fourth-order correlations between measurements and replicas have been used to generate a higher-order ambiguity surface that preserves the phase information. Drawbacks common to localization approaches relying on higher-order statistics are: (i) the need to know the phase of the acoustic source gains at the frequency ranges considered; and, (ii) the high number of measurements required for accurate estimation of higher-order moments.

Regarding notation used herein, upper (lower) bold face letters are used for matrices (column vectors); $(\bullet)'((\bullet)^\dagger)$ denotes matrix and vector transpose (conjugate transpose); $[\bullet]_{n,m}([\bullet]_n)$ the (n,m)-entry of a matrix (n-entry of a vector); diag(y) a diagonal matrix with y on its main diagonal; $I_N$ the N×N identity matrix; $1_M(0_M)$ an M×1 vector of ones (zeros); $\|y\|_q:=(\Sigma_{n=1}^N|y_n|^q)^{1/q}$, for $q \in (1,\infty)$, the $l_q$-norm in $\mathbb{C}^N$; $\|y\|_\infty := \max_n|y_n|$ the $l_\infty$-norm in $\mathbb{C}^N$; Re($\bullet$) the real-part operator; $(x)_+:=\max\{0,x\}$ the positive-part operator; for $x \in \mathbb{C}$, $|x|$ and arg(x) its magnitude and phase, respectively.

FIG. 1 shows a block diagram of an embodiment of the operational concept of a system 10 in accordance with the Multitask Learning Method for Broadband Source-Location Mapping of Acoustic Sources. System 10 includes K stationary acoustic sources 20, 30, and 40 in an environment such as shallow water propagation. Let $r_k \in \mathbb{R}^d$, $d \in \{2,3\}$, denote the unknown location of the k-th source. Each $r_k$ comprises the range, depth (with respect to the sea surface), and possibly azimuth for the k-th source.

An acoustic sensor array 50 detects acoustic signals 22, 32, and 42 from sources 20, 30, and 40, respectively. As an example, an acoustic sensor array 50 comprising an array of N hydrophones with known and arbitrary geometry, where N>0, is used to acquire T discrete time acoustic measurements $\{y(t) \in \mathbb{R}^N\}_{t=1}^T$, where $y_n(t):=[y(t)]_n$ corresponds to the acoustic measurements gathered by the n-th hydrophone at time t. With $h_n(t;r_k)$ denoting the discrete-time impulse response of the channel between $r_k$ and the n-th hydrophone, $y_n(t)$ is given by the equation $$y_n(t) = \Sigma_{k=1}^K [h_n(t,r_k) * s_k(t)] + \epsilon_n(t), n=1,\ldots,N \quad \text{(Eq. 1)}$$

where * denotes the convolution operator, $s_k(t)$ the acoustic signature for the k-th source, and $\epsilon E_n(t)$ is a zero-mean random variable representing the measurement noise at the n-th hydrophone.

Given $\{y(t)\}_{t=1}^T$ and K, the goal is to estimate the source locations $\{r_k\}_{k=1}^K$. In some embodiments, the estimation of source locations is performed by a processor 52 embedded within acoustic sensor array 50, with the results being transmitted, via signal 54, to receiver 60. In some embodiments, acoustic sensor array sends, via signal 54, the signal measurements to receiver 60, which performs the required processing. Estimation of source locations is, however, a difficult task since: (i) the NK impulse responses $h_n(t;r_k)$ are not exactly known; (ii) in general, the functional dependency of $h_n$ on $r_k$ is highly nonlinear and not available in closed form; and, (iii) the acoustic signatures $s_k(t)$ are unknown. The challenge in (i) can be partially alleviated by capitalizing on an appropriate underwater propagation model to describe the propagation environment at the frequency range of interest.

Although it is possible to work directly with $\{y(t)\}_{t=1}^T$, the computational complexity required to accurately reconstruct all $\{h_n(t;r_k)\}$ can be excessive. Instead, a frequency-based broadband source-localization approach is used that does not require reconstruction of the $\{h_n(t;r_k)\}$. To this end, $\{y(t)\}_{t=1}^T$ are partitioned to M (possibly overlapping) blocks. Per $\omega_f$, let $y_{m,f} \in \mathbb{C}^N$ and $s_{k,f} \in \mathbb{C}$ denote the discrete-time Fourier transform (DFT) coefficient vectors for the m-th measurement block and the acoustic gain DFT coefficient, respectively. Then, $\{y_{m,f}\}_{m=1}^M$ are modeled as $$y_{m,f} = \Sigma_{k=1}^K s_{k,f}(p_{k,f}+u_{k,f}) + \epsilon_{m,f} \quad m=1,\ldots,M \quad \text{(Eq. 2)}$$

where $\epsilon_{m,f}$ denotes the Fourier coefficients at $\omega_f$ corresponding to the noise in the m-th block; $p_{k,f} \in \mathbb{C}^N$ the $\omega_f$ model predicted Fourier coefficients at the array for a source located at $r_k$ normalized so that $\|p_{k,f}\|_2=1$, $\forall k$, henceforth referred to as replicas; and $u_{k,f} \in \mathbb{C}^N$ an unknown perturbation vector effecting $p_{k,f}$ accounting for the effect of mismatch between the adopted acoustic propagation model and the true propagation environment.

Let $Y_f:=[y_{1,f} \ldots y_{M,f}]$ comprise all M Fourier coefficient vectors at $\omega_f$. Given an underwater propagation model, Fourier coefficients $\{Y_f\}_{f=1}^F$, and K, broadband underwater source localization seeks $\{r_k\}_{k=1}^K$ while being robust to the perturbations $\{\{u_{k,f}\}_{k=1}^K\}_{f=1}^F$ on the replicas. Even if the adopted underwater propagation model were to exactly characterize the propagation environment, i.e., if all $\{u_{k,f}\}$ were known, and all the $s_{k,f}$ were also known, solving for the $\{r_k\}_{k=1}^K$ entails solving a difficult nonlinear regression problem. In fact, a closed-form expression relating $r_k$ to $p_{k,f}$ is unavailable since in most cases of interest finding $p_{k,f}$ entails solving the wave equation for specific boundary conditions given by the environment model.

Figure 2:
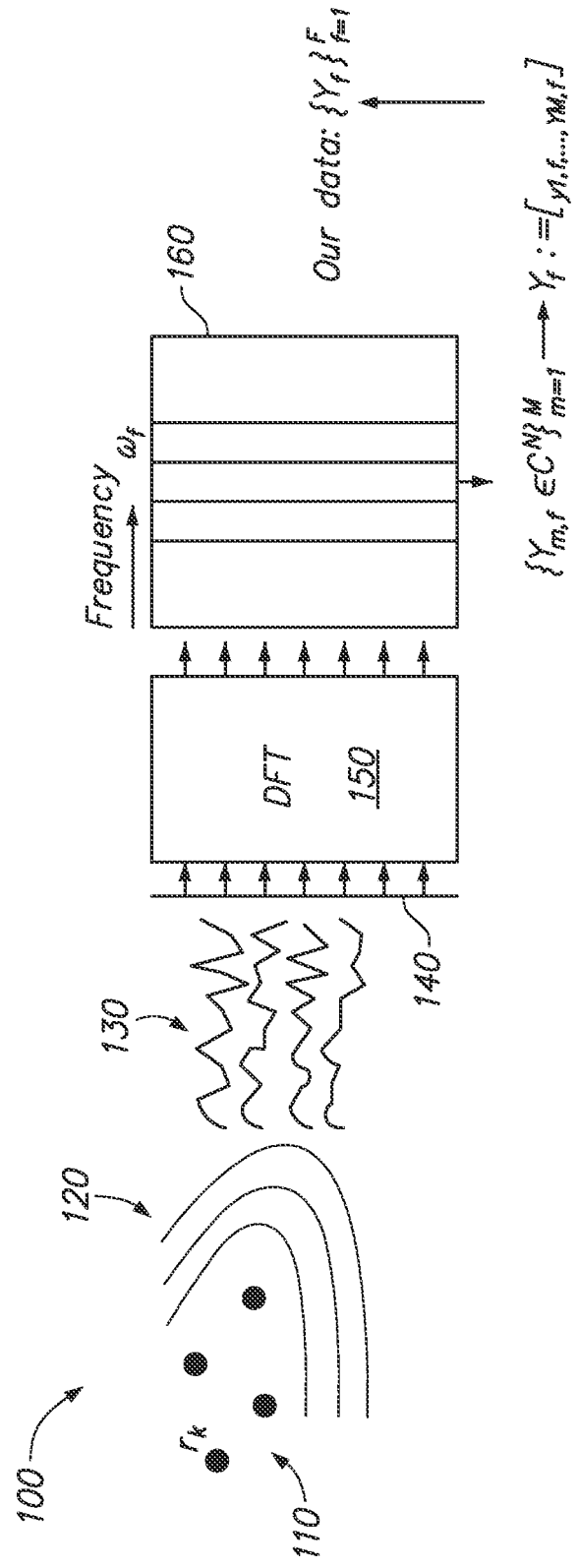
FIG. 2 shows a diagram of an embodiment of a data collection model used in accordance with the Multitask Learning Method for Broadband Source-Location Mapping of Acoustic Sources.
Figure 3:
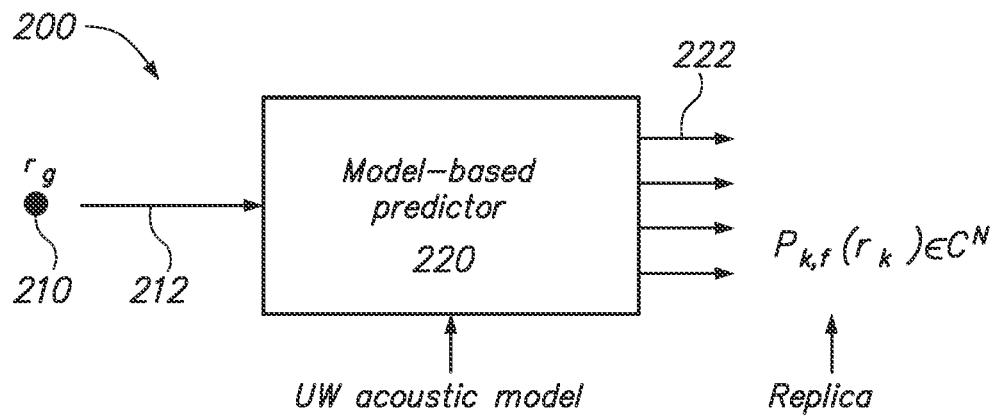
FIG. 3 shows a flowchart of an embodiment of a replica generation model in accordance with the Multitask Learning Method for Broadband Source-Location Mapping of Acoustic Sources.

As shown in diagram 100 of FIG. 2, acoustic sources 110 generate acoustic signals 120 that propagate through the propagation environment towards the array. Acoustic signals are captured by the acoustic sensor array 140 as a time series 130 of acoustic pressures. The times series data captured by each hydrophone in the array 140 is transformed to the Fourier domain via a DFT processing step 150 yielding DFT coefficient. The Fourier coefficients obtained across hydrophones for a set of F frequencies $\{\omega_1, \ldots, \omega_F\}$ are grouped to construct Fourier coefficient vectors $y_{m,f} \in \mathbb{C}^N$ at the end of processing step 160. Referring to FIG. 3, diagram 200 shows an embodiment of a model-based prediction component, where a signal 212 radiated from a postulated source location 210 is input into a model-based predictor 220. Based upon an acoustic model characterizing the true propagation environment, predictor 220 yields replica vectors 222, i.e., model-based predicted Fourier coefficients, which are used to model the $y_{m,f}$'s and determine the source localizations.

In order to circumvent the computational challenges posed by the non-linear relationship between $r_k$ and the $\{p_{k,f}\}_{f=1}^F$, a grid $\{r_g \in \mathbb{R}^d\}_{g=1}^G$ with G>>max{N,K} tentative locations $r_g$ spanning the region of interest is introduced. Let $p_{g,f}$ denote the replica vector at frequency $\omega_f$ for a source located at $r_g$. For given $\omega_f$, $P_f := [p_{1,f}, \ldots, p_{G,f}] \in \mathbb{C}^{N \times G}$ comprises all normalized replicas corresponding to the G locations where $\|p_{g,f}\|_2 = 1$, $\forall g$. Each $y_{m,f}$ is now modeled as $$y_{m,f} = \sum_{g=1}^G s_{g,f}(p_{g,f} + v_{g,f}) + \epsilon_{m,f} \quad \forall m,f \qquad (Eq.\ 3)$$

where $s_{g,f}$ denotes the acoustic gain at $\omega_f$ for a source located at $r_g$, $p_{g,f} \in \mathbb{C}^N$ is the replica for $\omega_f$ corresponding to a source located at $r_g$ normalized so that $\|p_{g,f}\|_2 = 1$, $v_{g,f} \in \mathbb{C}^N$ is an unknown perturbation vector effecting $p_{g,f}$, and $\epsilon_{m,f}$ denotes the Fourier coefficients at $\omega_f$ corresponding to the noise in the m-th block. Not only does the set $\{v_{g,f}\}$ captures the mismatch between the adopted propagation model and the true propagation environment, but also it captures mismatch induced on the replicas due to misalignment between $\{r_k\}_{k=1}^K$ and the $r \in \mathcal{G}$. Note that $s_{g,f}$ subsumes both the source acoustic gain and the path loss incurred by an acoustic signal transmitted from $r_g$ at $\omega_f$.

Since there are only K<<G acoustic sources present, most of the $\{s_{g,f}\}$ in (Eq. 3) are expected to be zero. Only those $s_{g,f}$ that correspond to the location of the sources are expected to take nonzero values. In terms of notation, let $s_f := [s_{1,f}, \ldots, s_{G,f}]^\top \in \mathbb{C}^G$ denote the complex-valued vector of regression coefficients at $\omega_f$, $S := [s_1, \ldots, s_F] \in \mathbb{C}^{G \times F}$ denote a complex-valued matrix comprising all regression coefficients, and $V_f := [v_{1,f}, \ldots, v_{G,f}] \in \mathbb{C}^{N \times G}$ denote a complex-valued matrix comprising all perturbation vectors for $\omega_f$. Using (Eq. 3), a broadband SLM may be obtained through the solution of the following problem for robust underwater source-location mapping: Given $\{(Y_f, P_f)\}_{f=1}^F$ and K, find K nonzero regression coefficients per column of S that minimize $\sum_{f=1}^F \|Y_f - (P_f + V_f)s_f 1_M^\top\|_2^2$ while being robust to $\{V_f\}_{f=1}^F$.

Figure 4:
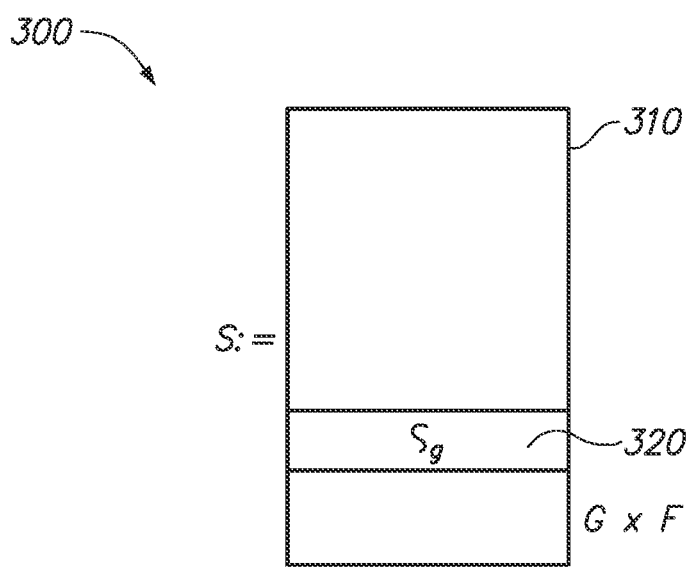
FIG. 4 shows a diagram of an example of a broadband source localization map.

FIG. 4 shows a diagram 300 of the structure of the regression coefficient matrix S 310. Once an estimate for S has been obtained, its columns can be used to construct SLMs over $\mathcal{G}$ per $\omega_f$. Furthermore, a broadband SLM can be constructed using whole rows of S for each $r_g \in \mathcal{G}$. For instance, after defining $\varsigma_g := [s_{g,1}, \ldots, s_{g,F}]^\top \in \mathbb{C}^F$ as the vector corresponding to the g-th row of S 320, an SLM can be constructed by plotting the pairs $(r_g, \|\varsigma_g\|_q)$ for all $r_g \in \mathcal{G}$ and q>1. The source localization estimates $\{\hat{r}_k\}_{k \in \mathcal{K}}$ indexed by the index-set $\mathcal{K} \subset \{1, \ldots, G\}$ correspond to the location of the K-largest entries in the map and are given by $$\mathcal{K} \in \underset{|\mathcal{K}|=K}{\arg\max} \sum_{k \in \mathcal{K}} \|\varsigma_k\|_q \qquad (Eq.\ 4)$$

Figure 5:
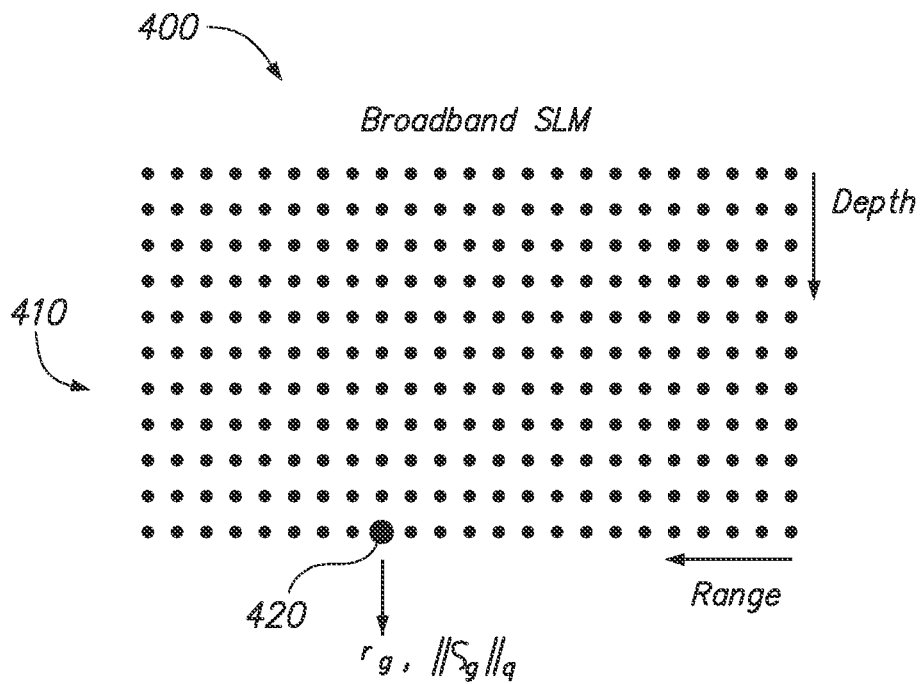
FIG. 5 shows a diagram of the structure of the regression coefficient matrix S.

FIG. 5 shows a diagram 400 of an embodiment of a broadband SLM 410 comprising a plurality of tentative locations and an estimated source location 420. Location 420 corresponds to a point $(r_g, \|\varsigma_g\varsigma_q\|)$ as discussed above. Although only one estimated source location 420 is shown for SLM 410, other SLMs may contain additional estimated source locations 420.

One approach to estimate S considers each frequency $\omega_f$ separately. Even if the perturbations $\{V_f\}_{f=1}^F$ were perfectly known, estimating each $s_f$ would require solving an underdetermined system of linear equations entailing G variables and MN equations, where usually G>>MN. Although using a minimum-norm estimator based on the Moore-Penrose pseudo-inverse for each $s_f$ is possible, such an estimator would be unaware of the sparse structure inherent to $s_f$ and sensitive to perturbations on $Y_f$. Moreover, considering each $s_f$ separately would disregard correlations among the columns of S. Naturally, estimating each $s_f$ is further complicated when $V_f$ is unknown.

Below, a robust estimator for S is developed. Hereafter, a stochastic model is adopted for the unknown perturbations $\{V_f\}_{f=1}^F$ as described next. A first assumption is that columns of $V_f$ are zero-mean random vectors with covariance matrix $\Sigma_f \in \mathbb{C}^{G \times G}$, and are independent across $V_f$'s. Thus, $\mathbb{E}\, V_f = O_{N \times G}$, $\forall f$; $\mathbb{E}\, V_f^\dagger V_f = \Sigma_f$, $\forall f$; and $\mathbb{E}\, V_f^\dagger V_{f'} = O_{G \times G}$, $\forall f \neq f'$. Each $\Sigma_f$ can be written as $\Sigma_f = Q_f D_f Q_f^\dagger$ where $Q_f$ is a unitary matrix and $D_f$ is a diagonal matrix whose main-diagonal entries $\{\sigma_{g,f}^2\}_{g=1}^G$ correspond to $\mathbb{E}\, \|v_{g,f}\|_2^2$.

The problem is now cast within a multi-task learning framework with F robust regression tasks as the following regularized stochastic LS problem:

$$\min_{S \in \mathbb{C}^{G \times F}} \frac{1}{2M} \sum_{f=1}^F \mathbb{E}\, \|Y_f - (P_f + V_f)s_f 1_M^\top\|_F^2 + \mu \sum_{g=1}^G \|\varsigma_g\|_q \qquad (Eq.\ 5)$$

where $\mu > 0$ is a tuning parameter controlling the sparsity level on S and $q \in (1, \infty]$. Each task in (Eq. 5) contrives to learn the regression coefficient vectors $s_f$ that best explain $Y_f$. Columns of S are expected to have a common support since their support corresponds to the source locations which are assumed constant across frequencies. A natural way to guarantee a common support for all columns of S, thereby enabling information sharing across tasks, is by inducing group sparsity on the rows of S as is done in (Eq. 5) by the $l_1/l_q$-regularizer. The $l_1/l_q$-regularizer, a.k.a. group-Lasso regularizer, is known to induce group sparsity. Hence, setting $q \in (1, \infty]$ in (Eq. 5) guarantees that the $\{s_f\}_{f=1}^F$ shares a common support while encouraging sparsity across the rows of S.

The problem in (Eq. 5) can be recast as a deterministic optimization problem as stated next. With $\bar{y}_f := Y_f 1_M/M$, the stochastic LS problem defined in (Eq. 5) is equivalent to the following deterministic optimization problem:

$$\min_{S \in \mathbb{C}^{G \times F}} \frac{1}{2} \sum_{f=1}^F (\|\bar{y}_f - P_f s_f\|_2^2 + s_f^\dagger \Sigma_f s_f) + \mu \sum_{g=1}^G \|\varsigma_g\|_q \qquad (Eq.\ 6)$$

The proof of equivalency between (Eq. 5) and (Eq. 6) follows after expanding the quadratic term within the expectation in (Eq. 5), using the assumption, and applying the definition for $\bar{y}_f$. The stochastic error fitting term in (Eq. 5) has been replaced by two deterministic terms in (Eq. 6): (i) a term capturing the goodness-of-fit term between the average replica $\bar{y}_f$ and the deterministic predictions $P_f s_f$; and, (ii) a term penalizing the size of $s_f$. Intuitively, on average $V_f$ causes larger variations on $P_f$ along the direction where it has larger variance. The term $s_f^\dagger \Sigma_f s_f$ penalizes the magnitude of every entry in $s_f$ proportionally to the level of uncertainty (measured by its variance) induced by the corresponding column of $V_f$.

Setting $\mu=0$ in (Eq. 6) renders the optimization problem separable across $s_f$. Per index f, the resulting regression problem is a weighted ridge regression one for which there exists a non-sparse closed-form solution $\hat{s}_f^{Ridge}=(P_f^\dagger P_f + \Sigma_f)^{-1}P^\dagger \bar{y}_f$. Although each $\hat{s}_f^{Ridge}$ is available in closed form, computing $\hat{s}_f^{Ridge}$ entails $O(G^3)$ computations rendering this approach computationally taxing for large G. With $\mu>0$, using q=1 is known to encourage sparsity on each $\varsigma_g$. Since $\Sigma_{g=1}^G \|\varsigma_g\|_1 = \Sigma_{f=1}^F \|s_f\|_1$, setting q=1 encourages sparsity in each column of S while rendering (Eq. 6) separable across columns of S as well. Further assuming that $\Sigma_f = \lambda_G$, $\lambda>0 \forall f$, allows one to interpret (Eq. 6) as an LS-regularized regression problem per f using the elastic-net penalty. Note that neither setting captures the affinity across the regression coefficients for the various $\omega_f$.

Regarding the choice of q, albeit any $l_1/l_q$ regularizers with $q \in (1, \infty]$ can be used to induce group sparsity on the rows of S while yielding an optimization problem that can be cast as a convex optimization one, it has been suggested that q can define the level of coupling allowed across coefficients in different tasks. For q=1, the coefficients within a group $\varsigma_g$ are uncoupled; for q=2, the same coefficients are highly coupled; and for $q=\infty$, their coupling is weaker. In fact, for the latter case the magnitude of the entries of $\varsigma_g$ can be set independently for each f so that $|[\varsigma_g]_f| \le \|\varsigma_g\|_\infty$, $\forall f$, without affecting the value of the regularization term.

Figure 6:
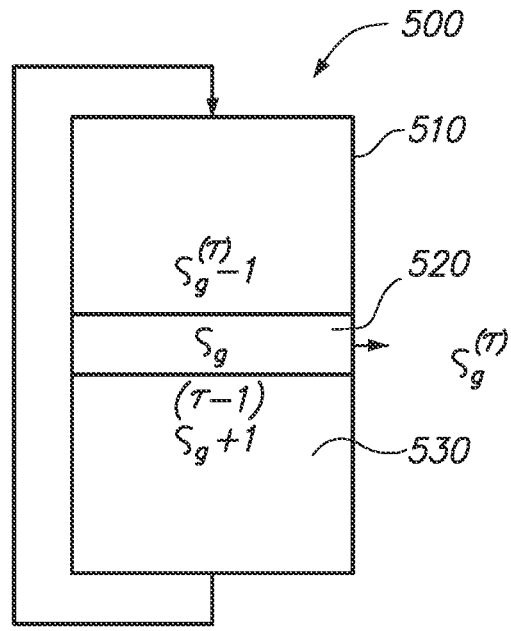
FIG. 6 shows a diagram of regression coefficient updates flowed by the block coordinate descent where a row $\varsigma_g$ of the matrix S is updated one at a time while keeping all other rows fixed.

As illustrated by the diagram 500 in FIG. 6, a block coordinate decent (BCD) solver iteratively updates $\varsigma_g$ 510 by minimizing the cost in (Eq. 6) with respect to each row of S while keeping all other ones fixed 510 and 530. It uses a cyclic rule to visit the rows of S from first-to-last. An algorithm for the BCD solver is shown as diagram 700 of FIG. 8

Figure 7:
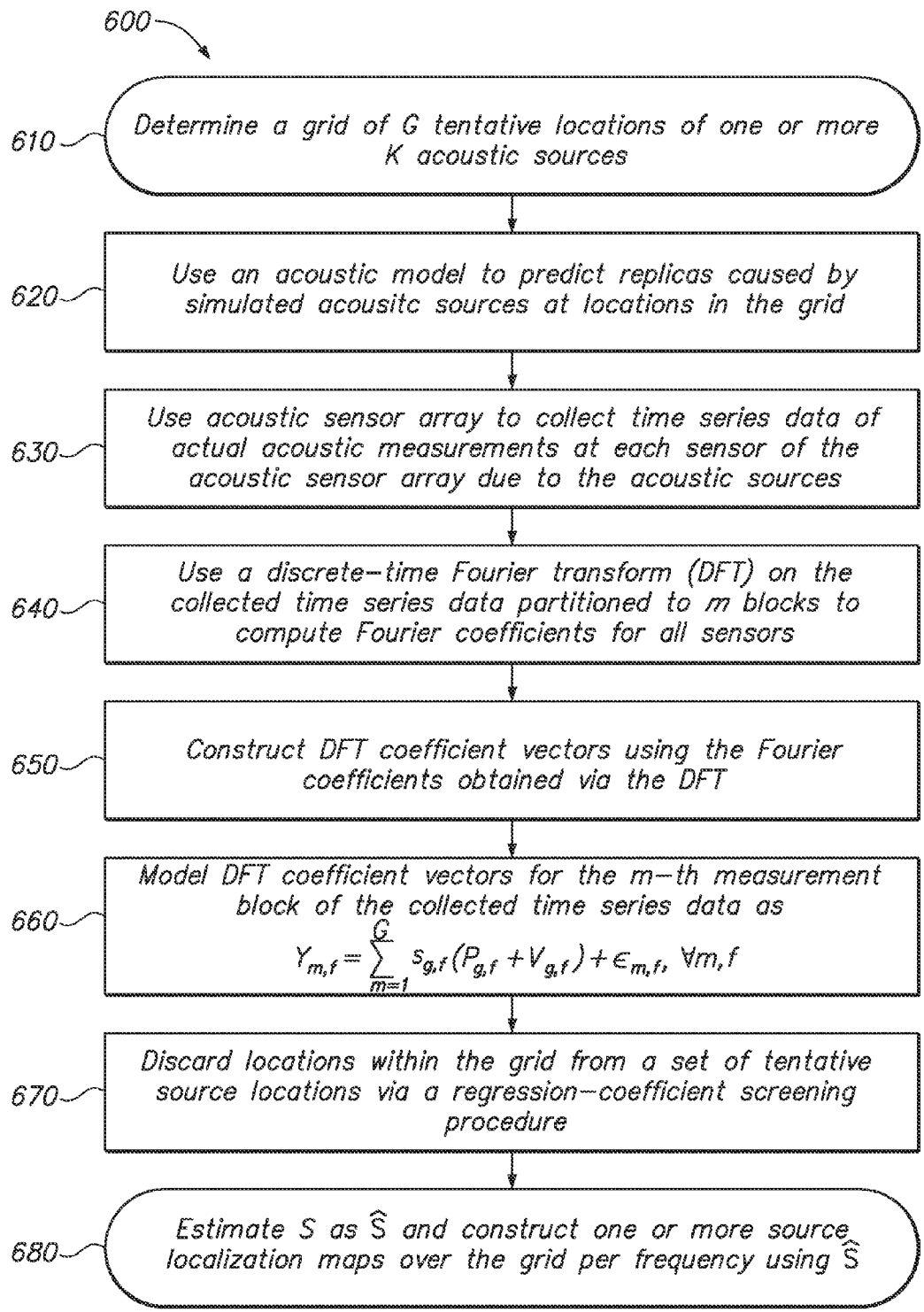
FIG. 7 shows a flowchart of an embodiment of a method in accordance with the Multitask Learning Method for Broadband Source-Location Mapping of Acoustic Sources.

FIG. 7 shows a flowchart of an embodiment of a method 600 in accordance with the Multitask Learning Method for Broadband Source-Location Mapping of Acoustic Sources. As an example, method 600 may be performed by system 10, 100, and 200 as shown in FIGS. 1-3. Also, while FIG. 7 shows one embodiment of method 600 to include steps 610-680, other embodiments of method 600 may contain fewer or more steps. Further, while in some embodiments the steps of method 600 may be performed as shown in FIG. 7, in other embodiments the steps may be performed in a different order, or certain steps may occur simultaneously with one or more other steps. Additionally, some or all of the steps of method 600 may be performed by processor 52 embedded within acoustic sensor array 50, by receiver 60, or by other processing means operatively connected to acoustic sensor array 50.

Method 600 may begin with step 610, which involves defining a grid $\mathcal{G}$ of G tentative locations $r_g$, base on the location of an acoustic sensor array 50, where up to K acoustic sources 20, 30, and 40 are presumed to be located. In some embodiments step 610 includes the step of estimating the number of acoustic sources, while in other embodiments the number of acoustic sources is predetermined.

Step 620 involves using an acoustic model to compute, via the model-based predictor 220, replicas caused by simulated acoustic sources at locations in $\mathcal{G}$, wherein the replicas are Fourier coefficient vectors at F frequencies $\{\omega_f\}_{f=1}^F$ corresponding to the acoustic pressure field 120 as sampled by an acoustic sensor array 140 having N sensors. Step 630 involves collecting, using the acoustic sensor array 140, time series data 130 of actual acoustic measurements at each sensor of the acoustic sensor array due to the acoustic sources 110.

Method 600 may proceed to step 640, which involves using a discrete-time Fourier transform (DFT) 150 on the collected time series data 130 partitioned to m blocks to compute Fourier coefficients at frequencies $\{\omega_f\}_{f=1}^F$ for all sensors. Step 650 involves constructing DFT coefficient vectors $y_{m,f} \in \mathbb{C}^N$, $\forall m,f$ at processing step 160 using the Fourier coefficients previously obtained via the DFT.

Step 660 involves modeling DFT coefficient vectors at $\omega_f$ for the m-th measurement block of the collected time series data as $y_{m,f} = \Sigma_{g=1}^G s_{g,f}(p_{g,f}+v_{g,f}) + \epsilon_{m,f}$, $\forall m,f$, where $s_{g,f}$ denotes the acoustic gain at $\omega_f$ for a source located at $r_g$, $p_{g,f} \in \mathbb{C}^N$ is the replica for $\omega_f$ corresponding to a source located at $r_g$ normalized so that $\|p_{g,f}\|_2=1$, $v_{g,f} \in \mathbb{C}^N$ is an unknown perturbation vector effecting $p_{g,f}$, and $\epsilon_{m,f}$ denotes the Fourier coefficients at $\omega_f$ corresponding to the noise in the m-th block.

Step 670 involves discarding locations from the set of tentative source locations $\mathcal{G}$ via a regression-coefficient screening procedure that depends on the available measurements, desired sparsity level, and specific form of an estimator for a complex-valued matrix S comprising all regression coefficients $\{s_{g,f}\}$. In some embodiments, the regression-coefficient screening procedure is used to identify a set of $\varsigma_g$'s prior to finding $\hat{S}$ such that the $\hat{\varsigma}_g = 0_F$. In some embodiments, the regression-coefficient screening procedure uses a screening rule where the optimal $\hat{\varsigma}_g(\mu'') = 0_F$ if and only if $$\sum_{f=1}^F \left( \sqrt{1+\sigma_{g,f}} \left| \frac{1}{\mu'} - \frac{1}{\mu''} \right| \|y\|_2 + |p_{g,f}^\dagger \tilde{y}_f^*(\mu')| \right)^p \le 1,$$

given $\{\tilde{y}_f^*(\mu')\}$ and $\mu'$, $\mu''$ such that $\mu' > \mu'' > 0$, where $\tilde{y}_f^*(\mu')$ is a Lagrange multiplier, wherein $\mu' = \mu_{max}$, for which $$\tilde{y}_f^*(\mu_{max}) = \frac{y_f}{\mu_{max}}.$$

Step 680 involves estimating $\hat{S}$ as $$\hat{S} := \mathrm{argmin}_{S \in \mathbb{C}^{G \times F}} \frac{1}{2M} \sum_{f=1}^F \mathbb{E} \|Y_f - (P_f+V_f)s_f 1_M'\|_F^2 + \mu \sum_{g=1}^G \|\varsigma_g\|_q,$$

where, for a given $\omega_f$, $Y_f = [y_{1,f} \ldots y_{M,f}]$ comprises all M DFT Fourier coefficient vectors, $P_f = [p_{1,f}, \ldots, p_{G,f}] \in \mathbb{C}^{N \times G}$ comprises all normalized replicas corresponding to locations in $\mathcal{G}$ where $\|p_{g,f}\|_2=1$, $\forall g,f$, $V_f = [v_{1,f}, \ldots, v_{G,f}] \in \mathbb{C}^{N \times G}$ is a complex-valued matrix comprising all perturbation vectors for $\omega_f$, $\mu$ is a tuning parameter controlling sparsity of the groups formed by the rows of S, $\varsigma_g := [s_{g,1}, \ldots, s_{g,F}]' \in \mathbb{C}^F$ comprises the vector corresponding to the g-th row of S, $s_f := [s_{1,f}, \ldots, s_{G,f}]' \in \mathbb{C}^F$ comprises the vector corresponding to the f-th column of S, $1_M$' an M×1 vector of ones, and $q \in (1,\infty]$.

Step 680 also involves constructing one or more source localization maps (SLMs) 300 over $\mathcal{G}$ per frequency $\omega_f$ using $\hat{S}$, wherein each location on a particular SLM is associated with its corresponding acoustic gain estimate $\hat{s}_{g,f}$ wherein estimates of the actual locations of the K acoustic sources correspond to the locations of the K-largest, in magnitude, coefficients $\hat{s}_{g,f}$ depicted in the SLM. In some embodiments, step 680 involves using each column $\hat{s}_f$ of $\hat{S}$ to construct the SLMs per frequency $\omega_f$, while in other embodiments, step 680 involves using a whole row of S for each $r_g \in \mathcal{G}$ to construct a broadband SLM. In some embodiments, the estimator for S is developed using a block coordinate descent approach.

Method 600 may be implemented as a series of modules, either functioning alone or in concert, with physical electronic and computer hardware devices. Method 600 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Simulation Results

The performance of the disclosed broadband underwater source localization mapping method (BB-SLM) is illustrated below. The environment considered corresponds to the one in the third Shallow-Water Evaluation Cell Experiment (SWellEX-3), see diagram 800 shown in FIG. 9. In SWellEX-3, a 64-element, 118.1 m aperture (1.875 m spacing) vertical line array 810, was mounted beneath the floating instrument platform in 198 m of water 820. For this analysis, only N=9 elements spaced 11.25 m apart were used, forming a total aperture of 90 m with the bottom element 6 m above the seafloor 830, with differing levels of depth shown by reference numbers 840, 850, and 860. A grid with G=20; 000 locations spanning radial distances 0-10 km and depths 0-198 m was used. The grid's radial and vertical spacing was 50 m and 2 m, respectively.

Figure 9:
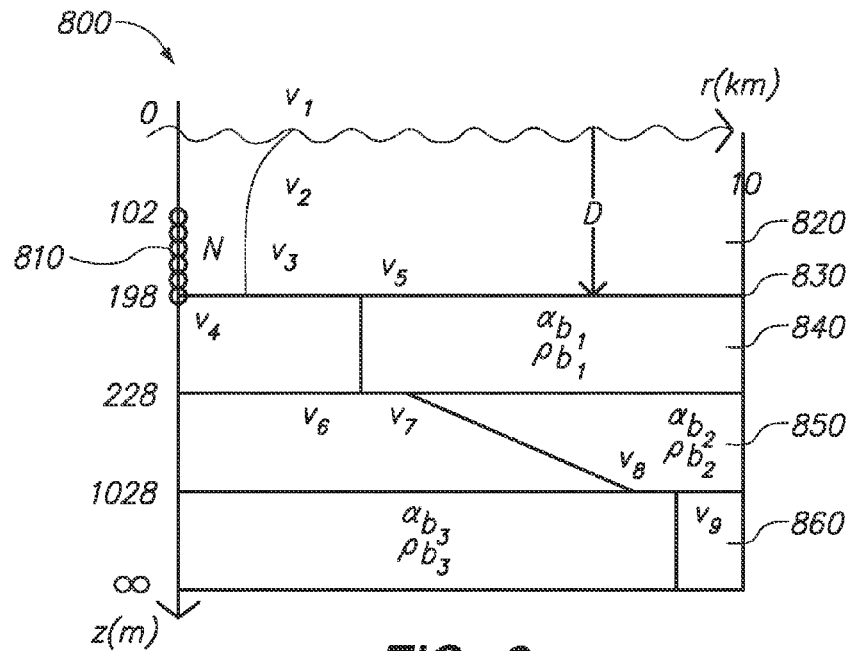
FIG. 9 shows a diagram of propagation model used to characterize the propagation environment of SWellEX-3.

Sample parameter values for the acoustic propagation model shown in FIG. 9 are: v1=1; 520 m/s, v2=1; 498 m/s, v3=1; 490 m/s, v4=1; 490 m/s, v5=1; 572 m/s, v6=1; 593 m/s, v7=1; 881 m/s, v8=3; 246 m/s, v9=5; 200 m/s, _b1=0:2 dB/m/KHz, _b2=0:06 dB/m/kHz, _b3=0:02 dB/m/kHz, _b1=1:76 g/cm3, _b2=2:06 g/cm3, and _b3=2:66 g/cm3.

The performance of the BB-SLM was compared to the one of: (i) incoherent Barlett, (ii) coherent broadband MFP (BB), (iii) coherent broadband MFP with white-noise constraint (WNC), (iv) the homotopy-based method (HB). For WNC, the diagonal loading factor was set to $0.01 \times \text{Tr}(R)$ where R denotes the sample covariance matrix.

Numerical results obtained from synthetic data were obtained from broadband sources transmitting at 5 frequencies $\{53+32k\}_{k=0}^{4}$. For the single source case, the source's gain was set to 125 dB per frequency, and its phase was chosen at random and was kept equal across frequencies. Predefined SNR values were obtained by adding different levels of additive white Gaussian noise to the scaled replicas at the array. HB and BB-SLM used M=1, while all other algorithms used M=10. A source with true location $(r_1, r_2)$ is correctly localized if the largest peak of the ambiguity surface or SLM lie within $\mathcal{L}(r_1, r_2) := \{(r_1 \pm k_1 \Delta r_1, r_2 \pm k_2 \Delta r_2), (r_1 \pm 2\Delta r_1, r_2), (r_1, r_2 \pm 2\Delta r_1): (k_1, k_2) \in \{-1, 0, 1\}^2\}$. Both the disclosed method and the HB method were tuned to stop if more than 5 non-zeros were present in the SLMs. Since there was no mismatch between the true environment and the model used, $\lambda=0$ was used.

Figure 10:
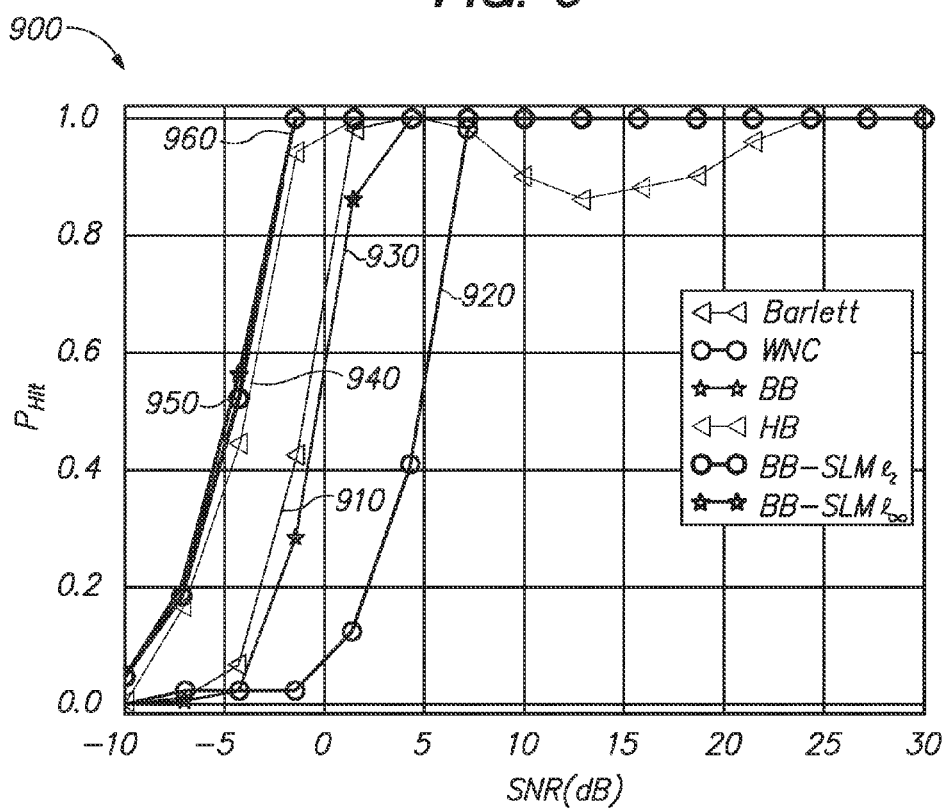
FIG. 10 shows a graph illustrating the probability of correct localization for a single acoustic source.
Figure 11:
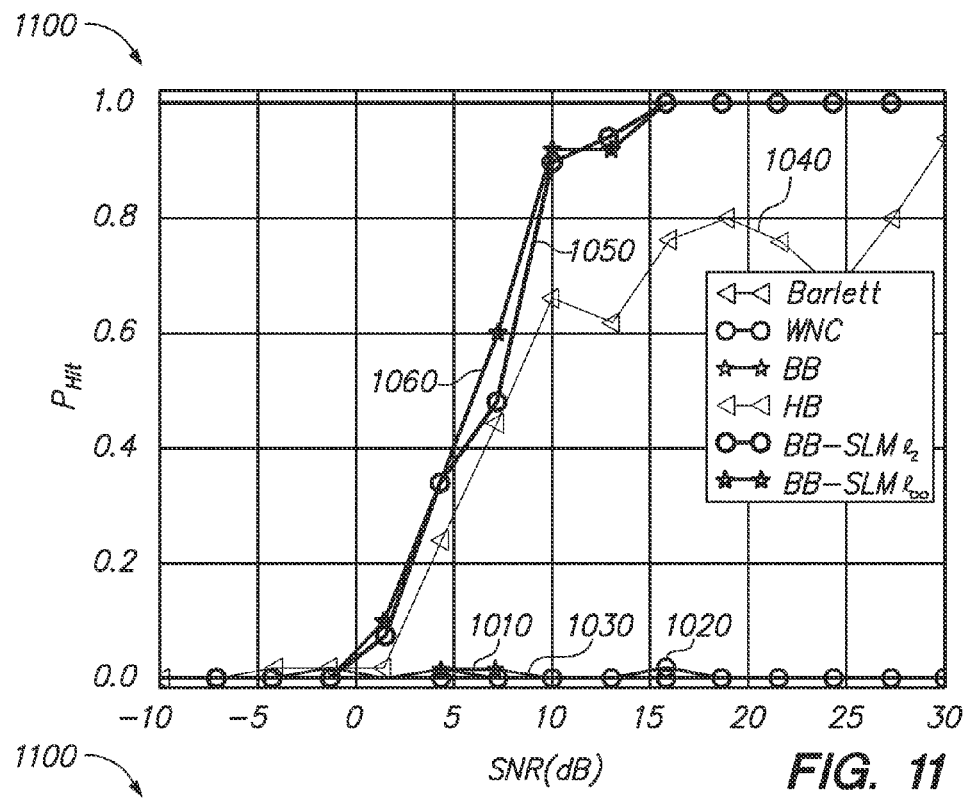
FIG. 11 shows a graph illustrating the probability of correct localization for two acoustic sources.

The probability of correct localization achieved by the various algorithms for a one- and two-source scenarios is illustrated in FIGS. 10 and 11. FIG. 10 shows a graph 900 illustrating the approach using both the $l_2$ and $l_\infty$ regularizers for the single source case, while FIG. 11 shows a graph 1000 illustrating the approach using both the $l_2$ and $l_\infty$ regularizers for the two source case. In FIG. 10, the acoustic source was located at (5 km, 100 m). Line 910 of FIG. 10 represents the Barlett method, line 920 represents the WNC approach, line 930 represents the BB method, line 940 represents the HB method, line 950 represents the BB-SLM $l_2$ method as discussed herein, and line 960 represents the BB-SLM $l_\infty$ method as discussed herein.

In FIG. 11, the two acoustic sources were located at located at (5 km, 100 m) and (2 km, 170 m). Line 1010 of FIG. 11 represents the Barlett method, line 1020 represents the WNC approach, line 1030 represents the BB method, line 1040 represents the HB method, line 1050 represents the BB-SLM $l_2$ method, and line 1060 represents the BB-SLM $l_\infty$ method. For the two source scenario, none of the MFP-based localization algorithms was able to correctly localize both sources even at high SNRs. The disclosed algorithm successfully localized both sources at medium and high SNRs.

Next, a scenario with two sources and a fixed average SNR at the receiver of 20 dB is considered. The source gains were set to 125 dB and their phases were chosen randomly. Both source gain and phase were set equal across frequencies for each source. The first source was kept fixed at 6.2 km range and 4 m depth. The second source moved away from the array at a constant depth of 146 m. Note that although the source levels are the same for all sources, their signal-to-interference-plus-noise-ratio at the receiver array is different for each source in accordance to their radial distance from the array.

Figure 12:
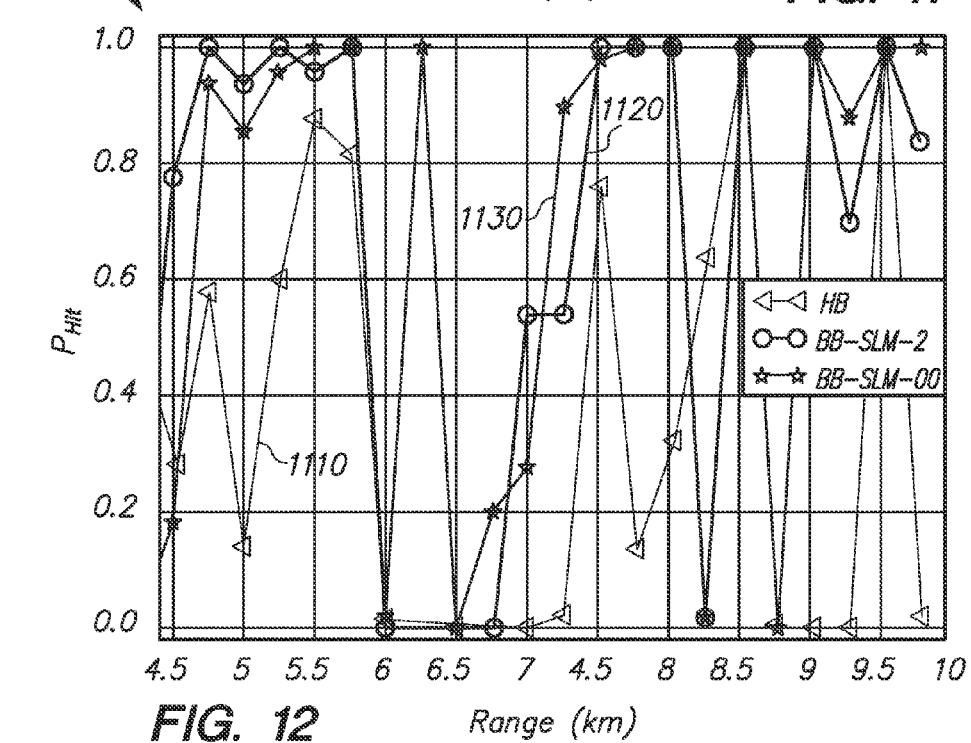
FIG. 12 shows a graph of the probability of correct localization for two sources, one at a fixed range and depth and the other moving along a straight line trajectory at a fixed depth.

FIG. 12 shows a graph 1100 illustrating the probability of correct localization of the disclosed method and the one of HB obtained for different ranges of the submerged source. Here, correct localization was defined to occur if the two largest peaks of the resulting SLMs lie within $\mathcal{L}(r_1, r_2)$ defined by the true source locations. The probability of correct localization at each range was averaged over 50 Monte Carlo runs per location. In this case, the MFP based algorithms were not able to correctly localized the two sources. Both SCBB and HB were able to correctly localize the sources achieving different performance at different ranges. However, SCBB yielded higher probabilities of correct localization at most ranges considered. The source gain for each source is set equal for each frequency so that their received power at the array is 125 dB. Their phases are chosen at random per source, but are kept equal across frequencies.

Although some embodiments of the method were discussed herein with regard to underwater source localization, some embodiments of the method may apply other acoustic source localization environments, such as above water, where accurate in-air acoustic propagation models are available. The embodiments of the method disclosed herein may also be extended to exploit prior information about source locations so as to develop sparsity-cognizant tracking algorithms using passive sonar. Another possible extension involves using spatially distributed arrays for localization as a way to exploit spatial diversity to counteract multipath affects in the localization performance and to reduce the presence of surveillance gaps.

Many modifications and variations of the Multitask Learning Method for Broadband Source-Location Mapping of Acoustic Sources are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:
1. A method comprising the steps of:
determining a grid $\mathcal{G}$ of G tentative locations $r_g$ of one or more K acoustic sources;
using an acoustic model to predict replicas caused by simulated acoustic sources at locations in $\mathbb{C}$, wherein the replicas are Fourier coefficient vectors at F frequencies $\{\omega_f\}_{f=1}^{F}$ corresponding to the acoustic pressure field as sampled by an acoustic sensor array having N sensors;
collecting, using the acoustic sensor array, time series data of actual acoustic measurements at each sensor of the acoustic sensor array due to the acoustic sources;
using a discrete-time Fourier transform (DFT) on the collected time series data partitioned to m blocks to compute Fourier coefficients at frequencies $\{\omega_f\}_{f=1}^{F}$ for all sensors;
constructing DFT coefficient vectors $y_{m,f} \in \mathbb{C}^N$, $\forall m, f$ using the Fourier coefficients previously obtained via the DFT;
modeling DFT coefficient vectors at $\omega_f$ for the m-th measurement block of the collected time series data as $y_{m,f} = \sum_{g=1}^{G} s_{g,f}(p_{g,f}+v_{g,f})+\epsilon_{m,f}$, $\forall m, f$, where $s_{g,f}$ denotes the acoustic gain at $\omega_f$ for a source located at $r_g$, $p_{g,f} \in \mathbb{C}^N$ is the replica for $\omega_f$ corresponding to a source located at $r_g$ normalized so that $\|p_{g,f}\|_2=1$, $v_{g,f} \in \mathbb{C}^N$ is an unknown perturbation vector effecting $p_{g,f}$ and $\epsilon_{m,f}$ denotes the Fourier coefficients at $\omega_f$ corresponding to the noise in the m-th block;
discarding locations within $\mathcal{G}$ from a set of tentative source locations via a regression-coefficient screening procedure that depends on the available measurements, desired sparsity level, and specific form of an estimator for a complex-valued matrix S comprising all regression coefficients $\{s_{g,f}\}$;
estimating S as

$$\hat{S} := \operatorname{argmin}_{S \in \mathbb{C}^{G \times F}} \frac{1}{2M} \sum_{f=1}^{F} \mathbb{E}\|Y_f - (P_f + V_f)s_f 1'_M\|_F^2 + \mu \sum_{g=1}^{G} \|\varsigma_g\|_q,$$

where, for a given $\omega_f$, $Y_f:=[y_{1,f} \ldots y_{M,f}]$ comprises all MDFT Fourier coefficient vectors, $P_f:=[p_{1,f}, \ldots, p_{G,f}] \in \mathbb{C}^{N \times G}$ comprises all normalized replicas corresponding to locations in $\mathcal{G}$ where $\|p_{g,f}\|_2=1$, $\forall g, f$, $V_f:=[v_{1,f}, \ldots, v_{G,f}] \in \mathbb{C}^{N \times G}$ is a complex-valued matrix comprising all perturbation vectors for $\omega_f$, $\mu$ is a tuning parameter controlling sparsity of the groups formed by the rows of S, $\varsigma_g:=[s_{g,1}, \ldots, s_{g,F}]' \in \mathbb{C}^F$ comprises the vector corresponding to the g-th row of S, $s_f:=[s_{1,f}, \ldots, s_{G,f}]' \in \mathbb{C}^F$ comprises the vector corresponding to the f-th column of S, $1_M$ an M×1 vector of ones, and $q \in (1, \infty]$; and constructing one or more SLMs over $\mathcal{G}$ per frequency $\omega_f$ using $\hat{S}$, wherein each location on a particular SLM is associated with its corresponding acoustic gain estimate $\hat{s}_{g,f}$ wherein estimates of the actual locations of the K acoustic sources correspond to the locations of the K-largest in magnitude coefficients $\hat{s}_{g,f}$ depicted in the SLM.

2. The method of claim 1, wherein the step of determining a grid of tentative locations of an underwater acoustic source includes the step of estimating the number of acoustic sources.

3. The method of claim 1, wherein the step of constructing SLMs per frequency $\omega_f$ comprises using each column $\hat{s}_f$ of $\hat{S}$ to construct the SLMs per frequency $\omega_f$.

4. The method of claim 1, wherein the step of constructing SLMs over $\mathcal{G}$ per frequency $\omega_f$ using S comprises using a whole row of S for each $r_g \in \mathcal{G}$ to construct a broadband SLM.

5. The method of claim 1, wherein the estimator for S is developed using a block coordinate descent approach.

6. The method of claim 1, wherein the acoustic sources are surface and underwater acoustic sources, the acoustic model is an underwater acoustic model, and the acoustic sensor array is a hydrophone array.

7. The method of claim 1, wherein the regression-coefficient screening procedure is used to identify a set of $\varsigma_g$'s prior to finding $\hat{S}$ such that the $\hat{\varsigma}_g = 0_F$.

8. The method of claim 7, wherein the regression-coefficient screening procedure uses a screening rule where the optimal $\hat{\varsigma}_g(\mu'')=0_F$ if and only if $$\sum_{f=1}^{F} \left( \sqrt{1+\sigma_{g,f}} \left| \frac{1}{\mu'} - \frac{1}{\mu''} \right| \|y\|_2 + |p_{g,f}^\dagger \tilde{y}_f^*(\mu')| \right)^p \le 1,$$

given $\{\tilde{y}_f^*(\mu')\}$ and $\mu'$, $\mu''$ such that $\mu' > \mu'' > 0$, where $\tilde{y}_f^*(\mu')$ is a Lagrange multiplier.

9. The method of claim 8, wherein $\mu' = \mu_{max}$, for which $$\tilde{y}_f^*(\mu_{max}) = \frac{y_f}{\mu_{max}}.$$

10. A system comprising:
a processor operatively connected to an acoustic sensor array, wherein the processor is configured to perform the steps of:
determining a grid $\mathcal{G}$ of G tentative locations $r_g$ of one or more K acoustic sources;
using an acoustic model to predict replicas caused by simulated acoustic sources at locations in $\mathcal{G}$, wherein the replicas are Fourier coefficient vectors at F frequencies $\{\omega_f\}_{f=1}^{F}$ corresponding to the acoustic pressure field as sampled by an acoustic sensor array having N sensors;
collecting, using the acoustic sensor array, time series data of actual acoustic measurements at each sensor of the acoustic sensor array due to the acoustic sources;
using a discrete-time Fourier transform (DFT) on the collected time series data partitioned to m blocks to compute Fourier coefficients at frequencies $\{\omega_f\}_{f=1}^{F}$ for all sensors;
constructing DFT coefficient vectors $y_{m,f} \in \mathbb{C}^N$, $\forall m, f$ using the Fourier coefficients previously obtained via the DFT;
modeling DFT coefficient vectors at $\omega_f$ for the m-th measurement block of the collected time series data as $y_{m,f} = \sum_{g=1}^{G} s_{g,f}(p_{g,f}+v_{g,f})+\epsilon_{m,f}$, $\forall m, f$, where $s_{g,f}$ denotes the acoustic gain at $\omega_f$ for a source located at $r_g$, $p_{g,f} \in \mathbb{C}^N$ is the replica for $\omega_f$ corresponding to a source located at $r_g$ normalized so that $\|p_{g,f}\|_2=1$, $v_{g,f} \in \mathbb{C}^N$ is an unknown perturbation vector effecting $p_{g,f}$, and $\epsilon_{m,f}$ denotes the Fourier coefficients at $\omega_f$ corresponding to the noise in the m-th block;

discarding locations within $\mathcal{G}$ from a set of tentative source locations via a regression-coefficient screening procedure that depends on the available measurements, desired sparsity level, and specific form of an estimator for a complex-valued matrix S comprising all regression coefficients $\{s_{g,f}\}$;

estimating S as $$\hat{S} := \operatorname{argmin}_{S \in \mathbb{C}^{G \times F}} \frac{1}{2M} \sum_{f=1}^{F} E\|Y_f - (P_f + V_f)s_f 1'_M\|_F^2 + \mu \sum_{g=1}^{G} \|\varsigma_g\|_q,$$

where, for a given $\omega_f$, $Y_f = [y_{1,f} \ldots y_{M,f}]$ comprises all MDFT Fourier coefficient vectors, $P_f = [p_{1,f}, \ldots, p_{G,f}] \in \mathbb{C}^{N \times G}$ comprises all normalized replicas corresponding to locations in $\mathcal{G}$ where $\|p_{g,f}\|_2=1$, $\forall g, f$, $V_f = [v_{1,f}, \ldots, v_{G,f}] \in \mathbb{C}^{N \times G}$ is a complex-valued matrix comprising all perturbation vectors for $\omega_f$, $\mu$ is a tuning parameter controlling sparsity of the groups formed by the rows of S, $\varsigma_g := [s_{g,1}, \ldots, s_{g,F}]' \in \mathbb{C}^F$ comprises the vector corresponding to the g-th row of S, $s_f := [s_{1,f}, \ldots, s_{G,f}]' \in \mathbb{C}^F$ comprises the vector corresponding to the f-th column of S, $1_M'$ an M×1 vector of ones, and $q \in (1, \infty]$; and constructing one or more SLMs over $\mathcal{G}$ per frequency $\omega_f$ using $\hat{S}$, wherein each location on a particular SLM is associated with its corresponding acoustic gain estimate $\hat{s}_{g,f}$, wherein estimates of the actual locations of the K acoustic sources correspond to the locations of the K-largest in magnitude coefficients $\hat{s}_{g,f}$ depicted in the SLM.

11. The system of claim 10, wherein the step of determining a grid of tentative locations of an underwater acoustic source includes the step of estimating the number of acoustic sources.

12. The system of claim 10, wherein the step of constructing SLMs per frequency $\omega_f$ comprises using each column $\hat{s}_f$ of $\hat{S}$ to construct the SLMs per frequency $\omega_f$.

13. The system of claim 10, wherein the step of constructing SLMs over $\mathcal{G}$ per frequency $\omega_f$ using S comprises using a whole row of S for each $r_g \in \mathcal{G}$ to construct a broadband SLM.

14. The system of claim 10, wherein the estimator for S is developed using a block coordinate descent approach.

15. The system of claim 10, wherein the acoustic sources are surface and underwater acoustic sources, the acoustic model is an underwater acoustic model, and the acoustic sensor array is a hydrophone array.

16. The system of claim 10, wherein the regression-coefficient screening procedure is used to identify a set of $\varsigma_g$'s prior to finding $\hat{S}$ such that the $\hat{\varsigma}_g = 0_F$.

17. The system of claim 16, wherein the regression-coefficient screening procedure uses a screening rule where the optimal $\hat{\varsigma}_g(\mu'') = 0_F$ if and only if $$\sum_{f=1}^{F} \left( \sqrt{1+\sigma_{g,f}} \left| \frac{1}{\mu'} - \frac{1}{\mu''} \right| \|y\|_2 + |p_{g,f}^\dagger \tilde{y}_f^*(\mu')| \right)^p \le 1,$$

given $\{\tilde{y}_f^*(\mu')\}$ and $\mu'$, $\mu''$ such that $\mu' > \mu'' > 0$, where $\tilde{y}_f^*(\mu')$ is a Lagrange multiplier, wherein $\mu' = \mu_{max}$, for which $$\tilde{y}_f^*(\mu_{max}) = \frac{y_f}{\mu_{max}}.$$

* * * * *